United States Patent [19]
Hakamada et al.

[11] Patent Number: 5,385,378
[45] Date of Patent: Jan. 31, 1995

[54] GLOVE BOX STRUCTURE FOR MOTOR VEHICLES

[75] Inventors: Hitoshi Hakamada; Kenji Hoshino, both of Tochigi, Japan

[73] Assignee: Honda Giken Kogyo Kabushiki Kaisha, Tokyo, Japan

[21] Appl. No.: 127,515

[22] Filed: Sep. 28, 1993

[30] Foreign Application Priority Data

Sep. 28, 1992 [JP] Japan .................................. 4-282517

[51] Int. Cl.$^6$ .............................................. B60R 7/06
[52] U.S. Cl. ................................... 296/37.12; 16/82; 16/374
[58] Field of Search .................... 296/37.8, 37.12; 224/282, 42.42; 16/82, 374

[56] References Cited

U.S. PATENT DOCUMENTS

| | | | |
|---|---|---|---|
| 2,571,627 | 10/1951 | Sloman et al. | 296/37.12 X |
| 3,662,214 | 5/1972 | Matuska | 16/82 X |
| 4,630,857 | 12/1986 | Zweiniger et al. | 224/282 X |

FOREIGN PATENT DOCUMENTS 4005140  1/1992  Japan ........................ 296/37.12

*Primary Examiner*—Dean J. Kramer
*Attorney, Agent, or Firm*—Armstrong, Westerman, Hattori, McLeland & Naughton

[57] ABSTRACT

A glove box is pivotally mounted at a lower end thereof in an opening defined in an instrument panel. The glove box is angularly movable from the opening to an opening limit position in which the glove box is locked and partly opens the opening. The opening is defined by a partition assembly which includes a side partition having a rail. The glove box has a roll rotatably mounted on an arm coupled to a shaft rotatably supported on the glove box. When the glove box is in the opening limit position, the roll is engaged by the rail. To service an accessory device, such as the inflator of an air bag or the filter of an air-conditioning unit, disposed behind the opening, the shaft is rotated to turn the arm to displace the roll out of engagement with the rail, thus allowing the glove box to be tilted from the opening limit position to a fully open position in which the glove box fully opens the opening. The serviceman can now reach the accessory device directly through the opening.

14 Claims, 5 Drawing Sheets

GLOVE BOX STRUCTURE FOR MOTOR VEHICLES

BACKGROUND OF THE INVENTION

1. Field of the Invention

The present invention relates to a glove box for use in an instrument panel on the front end of the passenger compartment of a motor vehicle, such as an automobile, and more particularly to a glove box structure which allows various devices disposed behind a glove box to be serviced easily and smoothly.

2. Description of the Related Art

Instrument panels disposed at the front end of the passenger compartment of motor vehicles such as automobiles usually have a glove box positioned in front of the passenger seat for accommodating personal belongings and other small items.

The glove boxes are generally classified into two types. The glove boxes of one category are essentially a recess defined in the instrument panel and a lid hinged to the instrument panel for openably closing the recess. According to the other class, a separate glove box is removably placed in an opening defined in the instrument panel.

Motor vehicles often have an air bag for a passenger seat and an air-conditioning unit. If the inflator of such an air bag and the air-conditioning unit are positioned behind the glove box, then they cannot easily be serviced from within the passenger compartment because of a rear wall of the recess or the glove box itself which is located in front of the inflator and the air-conditioning unit. For easy and efficient maintenance of the inflator and the air-conditioning unit, therefore, it is necessary to remove the instrument panel in its entirety from the vehicle body or disassemble and remove the glove box from the instrument panel. Such a procedure is, however, inefficient as it retards the servicing process.

An alternative servicing practice for replacing the filter of the air-conditioning unit, for example, is to reach the air-conditioning unit from below the glove box. However, since the serviceman is required to put himself in a limited space in the passenger compartment and extend his arm to replace the filter, it is very hard and cumbersome to do the servicing process.

SUMMARY OF THE INVENTION

It is therefore an object of the present invention to provide a glove box structure which allows a glove box to be fully opened for permitting a serviceman to reach the inflator of an air bag or an air-conditioning unit directly from the front side thereof, so that the inflator or the air-conditioning unit can easily and efficiently be serviced for replacement of a filter, for example.

According to the present invention, there is provided a glove box structure for use in an instrument panel in a motor vehicle, comprising a partition assembly defining an opening, a glove box pivotally mounted at a lower end thereof in the opening for angular movement between a first angular position in which the glove box is fully disposed in the opening, a second angular position in which the glove box is partly displaced out of the opening, and a third angular position in which the glove box is fully displaced out of the opening, the partition assembly including a side partition having a limit member, the glove box having an engaging member for engaging the limit member to lock the glove box in the second angular position, and releasing means mounted on the glove box for releasing the engaging member from the limit member to allow the glove box to angularly move from the second angular position to the third angular position.

According to the present invention, there is also provided a glove box structure for use in an instrument panel in a motor vehicle, comprising a partition assembly defining an opening, a glove box pivotally housed in the opening and angularly movable from the opening to an opening limit position in which the glove box partly opens the opening, a fixed lock member fixed to the partition assembly, a movable engaging member movably mounted on the glove box and normally engageable with the fixed lock member to lock the glove box in the opening limit position when the glove box is angularly moved to the opening limit position, and control means mounted on the glove box for moving the movable engaging member out of engagement with the fixed lock member to allow the glove box to angularly move from the opening limit position to a fully open position in which the glove box fully opens the opening.

The inflator of an air bag may be positioned behind the opening and accessible through the opening when the glove box is in the third angular position or the fully open position.

Alternatively, the filter of an air-conditioning unit may be positioned behind the opening and accessible through the opening when the glove box is in the third angular position or the fully open position.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
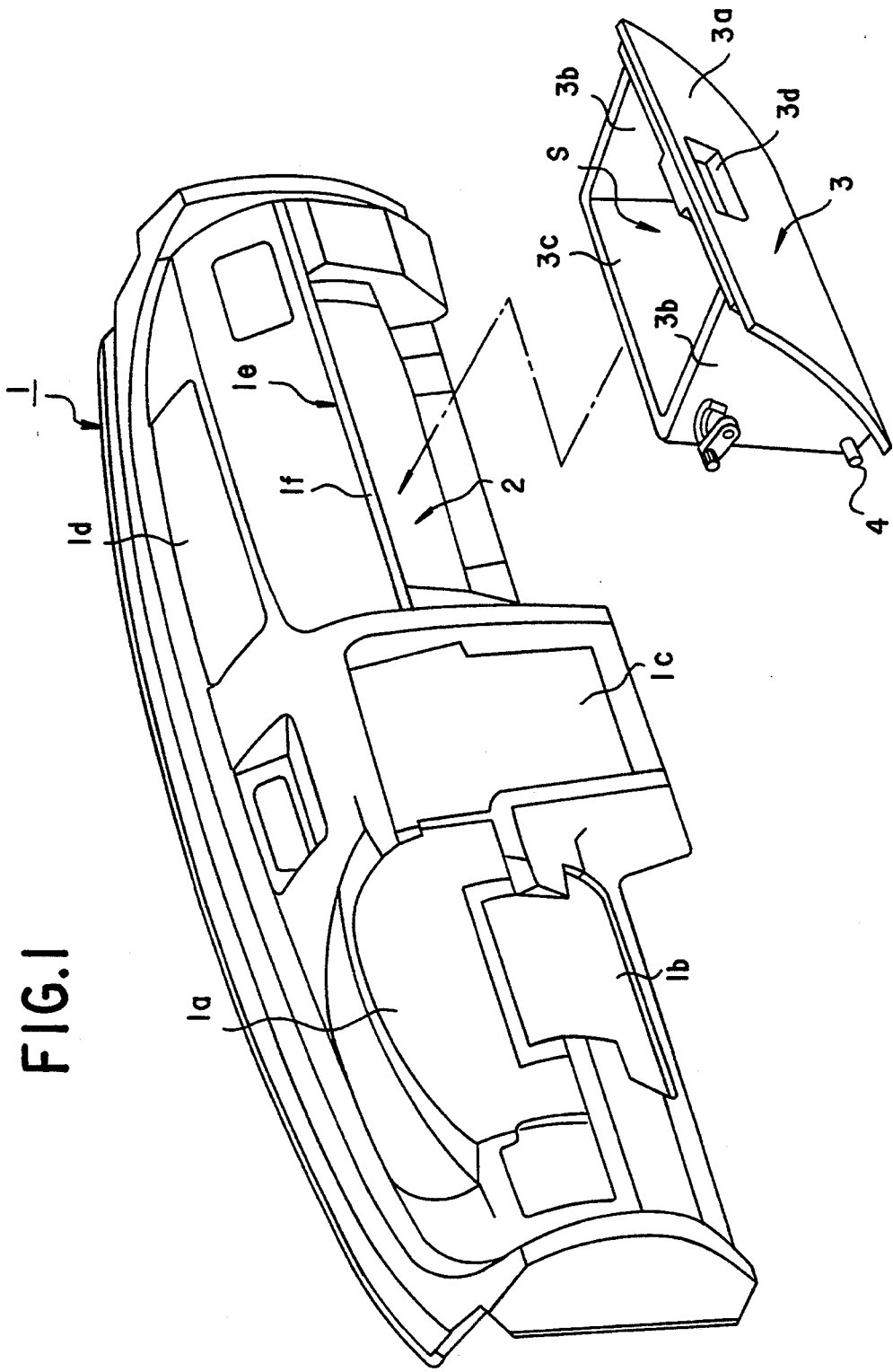
FIG. 1 is an exploded perspective view of an instrument panel and a glove box according to the present invention.

As shown in FIG. 1, an instrument panel 1 to be positioned at the front end of the passenger compartment of a motor vehicle, such as an automobile with a left-hand steering wheel, includes an instrument attachment area 1a and a steering column insertion area 1b on a left-hand portion thereof, an audio set attachment area 1c on a central portion thereof, and a lid plate 1d for a passenger air bag on an upper area of a right-hand portion thereof. The instrument panel 1 also has an opening 2 defined in a lower region 1e of the right-hand portion thereof and extending in the longitudinal direction of the motor vehicle.

The lower region 1e has an upper portion 1f projecting rearward in the longitudinal direction of the motor vehicle, and is inclined downwardly forward in the longitudinal direction of the motor vehicle. The lower region 1e has a lower portion 1g (see FIG. 2) positioned most forward with the opening 2 defined vertically between the upper and lower portions 1f, 1g. The opening 2 fully extends through the lower region 1e in the longitudinal direction of the motor vehicle, and has its upper end bounded by a horizontal partition 1h and opposite lateral ends bounded by a pair of laterally spaced vertical side partitions 1i (only one shown in FIG. 2). The opening 2 extends in the longitudinal direction of the motor vehicle and opens obliquely downwardly, and is bounded at its upper and lateral ends by the partitions 1h, 1i.

A glove box 3 according to the present invention is fitted in the opening 3.

The glove box 3 is of a substantially inverted triangular shape in side elevation. The glove box 3 comprises a front panel 3a which lies substantially flush with the surrounding surface of the instrument panel 1 when the glove box 3 is fully fitted in the opening 3, a pair of laterally spaced side panels 3b joined at their front edges to the front panel 3a, and a rear panel 3c joined to the rear edges of the side panels 3b. When the glove box 3 is fully fitted in the opening 3, the front panel 3a is inclined downwardly forward in the longitudinal direction of the motor vehicle, and the rear panel 3c extends substantially vertically. The lower ends of the front and rear panels 3a, 3c jointly serve as the bottom of the glove box 3. The front panel 3a has a recess 3d defined in a laterally central portion of its front surface. The user of the glove box 3 inserts a finger or fingers into the recess 3d and pulls or pushes the front panel 3a to open or close the glove box 3.

The glove box 3 defines a pocket or space S for accommodating personal belongings or small items which has a larger upper opening and is progressively narrower downwardly.

The side panels 3b have respective lower ends pivotally coupled by respective pins 4 to the respective side partitions 1i. Thus, the glove box 3 is swingable into and out of the opening 2 about the pins 4 when the user pushes and pulls the front panel 3a.

Figure 2:
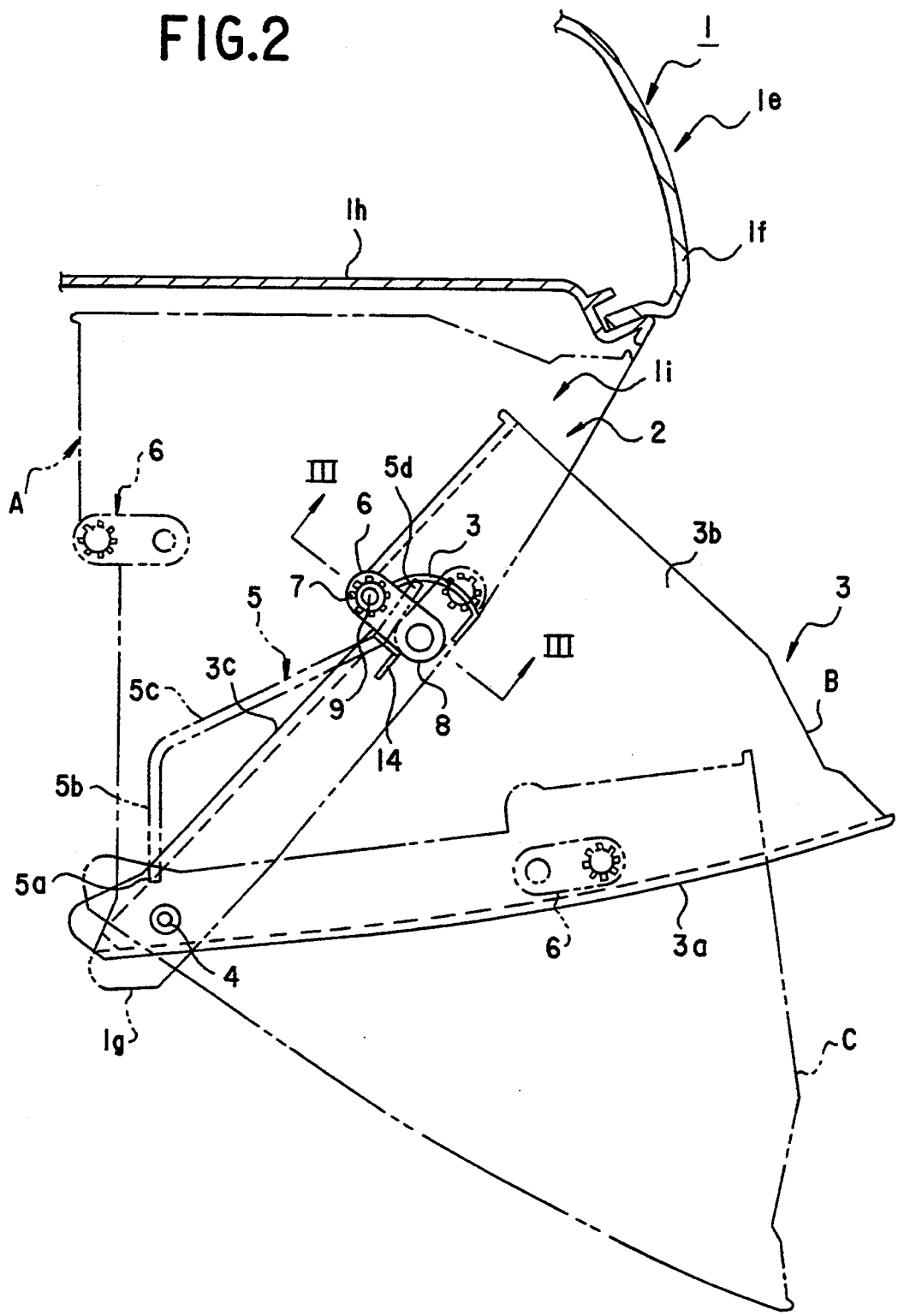
FIG. 2 is an enlarged vertical cross-sectional view of the instrument panel with the glove box accommodated in an opening defined therein, the glove box being open.

In FIG. 2, the glove box 3 is shown as being pulled out of the opening 2 so that personal belongings or small items can be placed into or taken from the pocket S.

As shown in FIG. 2, the side partitions 1i have respective rails 5 mounted on their inner surfaces facing the opening 2 for limiting opening and closing angular movement of the glove box 3 as described later on. Only one of the side partitions 1i may have a rail 5.

Each of the rails 5 has a vertical lower portion 5b extending vertically from a lower end 5a which is slightly spaced upwardly from the pin 4, an inclined intermediate portion 5c extending obliquely forward and upwardly from the upper end of the lower portion 5b, and an inclined lock portion 5d extending obliquely forward and more upwardly from the upper end of the intermediate portion 5c.

Figure 3:
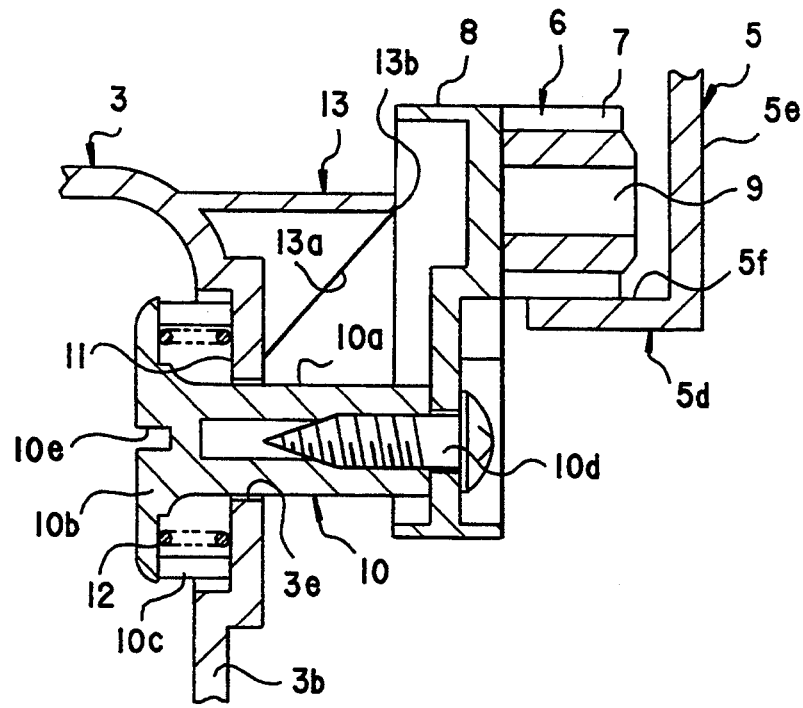
FIG. 3 is a cross-sectional view taken along line III—III of FIG. 2.

As illustrated in FIG. 3, at least the lock portion 5d has an L-shaped cross section and comprises a vertical member 5e lying parallel to the side partition 1i and a limit member 5f projecting laterally from the vertical member 5e into the opening 2.

The side panels 3b have respective lock rollers 6 mounted on their outer surfaces facing away from the pocket S at a vertically intermediate position near the rear panel 3c, for engaging respective backs of the limit members 5f of the lock portions 5d of the rails 5 to lock the glove box 3 in an opening limit position as shown in FIG. 2. Only one of the side panels 3b may have a lock roller 6.

As shown in FIGS. 2 and 3, each of the lock rollers 6 comprises a roll 7 for rolling contact with the rear surface of the limit member 5f when the glove box 3 is in the opening limit position. The roll 7 is in the form of a toothed wheel having a plurality of radial teeth on its outer circumferential surface and is rotatably supported on an end of an elongate arm 8 by a pin 9.

Each of the side panels 3b has a hole 3e defined therein and supports a control shaft 10 extending through the hole 3e across the side panel 3b. The control shaft 10 has a shank 10a projecting outwardly from the side panel 3b, and the arm 8 is fastened at its opposite end to the outer end of the shank 10a by a screw 10d. The control shaft 10 and hence the arm 8 are angularly movable with respect to the side panel 3b.

Each of the side panels 3b has an integral recessed spring seat 11 projecting outwardly thereof and extending around the hole 3e. The control shaft 10 has an integral disk-shaped head 10b on an end thereof which is positioned in the glove box 3 remotely from the outer end of the shank 10a. The head 10b includes a plurality of circumferentially spaced retainer legs 10c spaced radially outwardly from the shank 10a and projecting axially parallel to the shank 10a toward the recessed spring seat 11. A compression coil spring 12 is disposed around the shank 10a axially between the disk-shaped head 10b and the recessed spring seat 11 for normally urging the control shaft 10 into the glove box 3. The disk-shaped head 10b has a slot 10e defined in an outer surface thereof in alignment with the shank 10a. The tip of a screwdriver or the like may be inserted into the slot 10e to assist in turning the head 10b as described later on.

Each of the side panels 3b also has a cam wall 13 (see also FIG. 5) disposed on its outer surface in surrounding relationship to an upper portion of the recessed spring seat 11. The cam wall 13, which is of an arcuate shape in FIG. 2, has a cam edge 13a which includes a crest 13b that is highest, i.e., spaced a largest distance from the side panel 3b, at its intermediate position, and is progressively inclined toward the side panel 3b in opposite directions away from the crest 13b.

Figure 5:
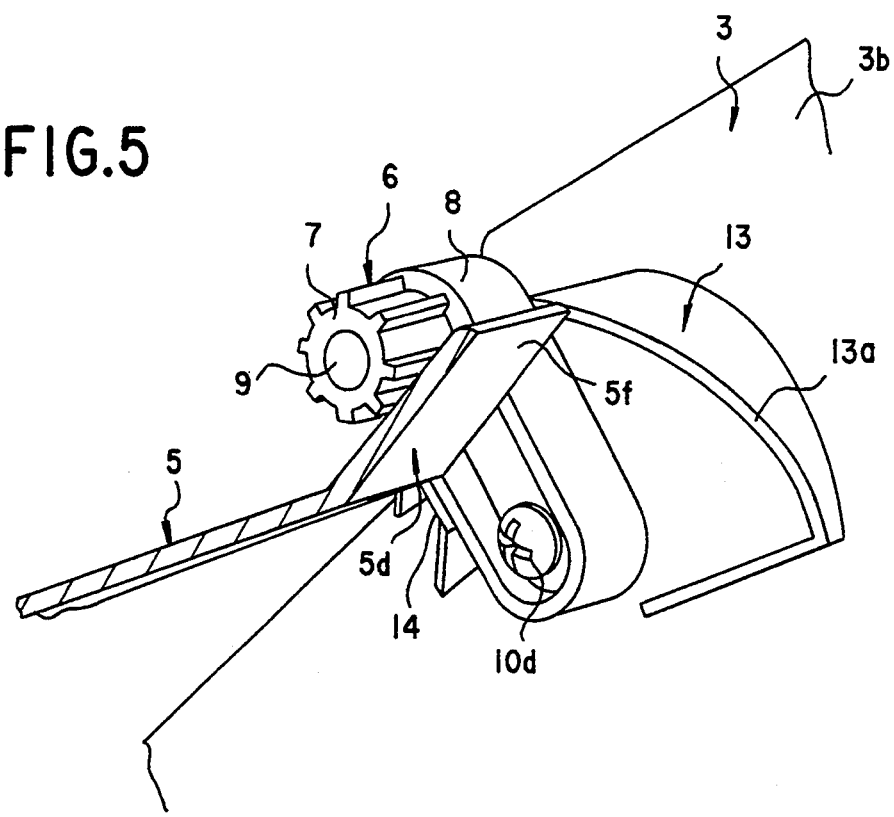
FIG. 5 is a fragmentary perspective view of a lock mechanism and an unlock mechanism as they are viewed from outside of the glove box.

As shown in FIGS. 2 and 5, each of the side panels 3b further has a stopper 14 projecting from the outer surface thereof and positioned opposite to the cam wall 13. The stopper 14 serves to engage an edge of the arm 8 for preventing the arm 8 from excessively swinging with respect to the side panel 3b beyond the position shown in FIG. 2.

The control shaft 10 is normally urged to move to the left in FIG. 3 under the bias of the spring 12. In FIG. 3, the arm 8 is in a locked position and has its back near its distal end held in abutment against the crest 13b of the cam edge 13a. Therefore, the roll 7 is positioned away from the side panel 3b against the bias of the spring 12. When the glove box 3 is pulled open as shown in FIG. 2, the roll 7 engages the limit member 5f of the lock portion 5d.

When the glove box 3 is pushed into the opening 2, the rear panel 3c extends substantially vertically as indicated by the imaginary line A in FIG. 2. At this time, the front panel 3a lies substantially flush with the surrounding surface of the instrument panel 1.

Once the glove box 3 is housed in the opening 2, the glove box 3 remains closed by a lock (not shown) in the recess 3d and a catcher or the like (not shown) in the opening 2.

When the glove box 3 is unlocked and pulled out of the opening 2, the glove box 3 is tilted forward about the pins 4 into the solid-line position B (opening limit position) in FIG. 2. With the glove box 3 being thus open, the user can take personal belongings or small items into and out of the glove box 3. Before the glove box 3 reaches the opening limit position in FIG. 2, the rail 5 does not engage the roll 7. Near the opening limit position, the roll 7 starts engaging the back of the limit member 5f. Upon engagement of the roll 7 with the limit member 5f, the glove box 3 is prevented from being further tilted forward and locked in the opening limit position.

In order to access an accessory device which is positioned behind the glove box 3 to service the accessory device, it is necessary to further pull the glove box 3 downwardly beyond the opening limit position to displace the glove box 3 fully out of the opening 3.

Figure 4:
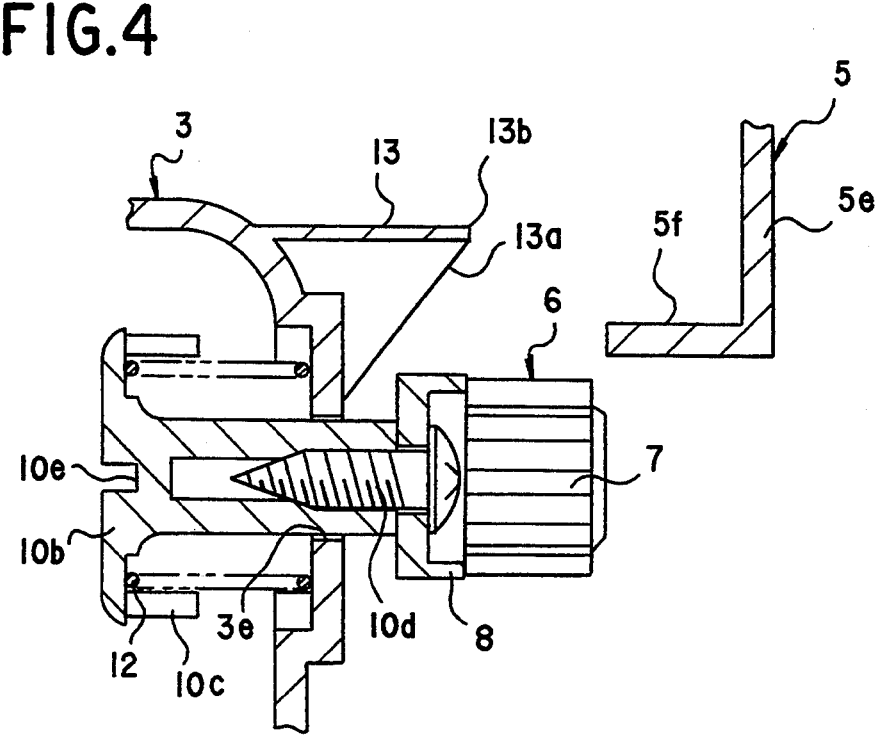
FIG. 4 is a view similar to FIG. 3, showing the glove box being unlocked.

To allow the glove box 3 to be fully displaced from the opening 3, the head 10b of the control shaft 10 on each of the side panels 3b is manually turned probably with the aid of a screwdriver or the like. At this time, the arm 8 joined to the shaft 10 is turned clockwise in FIG. 2. Inasmuch as the arm 8 engages the cam edge 13a under the force of the spring 12, the arm 8 and hence the shaft 10 are axially moved to the left in FIG. 3 under the bias of the spring 12 while the arm 8 is being guided by the inclined cam edge 13a. When the arm 8 is thus turned and axially moved, it is positioned as indicated by the imaginary line in FIG. 2, and the roll 7 supported thereon is finally brought out of engagement with the limit member 5f of the lock portion 5d, as shown in FIG. 4.

Since the roll 7 is no longer engaged by the limit member 5f, the glove box 3 is unlocked from the opening limit position, and can freely be tilted further downwardly about the pins 4 into a fully open position indicated by the imaginary line C in FIG. 2.

To return the glove box 3 back into the opening 2, the glove box 3 is manually turned upwardly about the pins 4 into the solid-line position B in FIG. 2 with the arm 8 in the imaginary-line position. When the glove box 3 reaches the solid-line position B in FIG. 2, the head 10b of the control shaft 10 is turned backward until the roll 7 engages the lock portion 5d of the rail 5. Now, the glove box 3 is prevented from being further opened beyond the opening limit position, and hence can function as an ordinary glove box.

Figure 6:
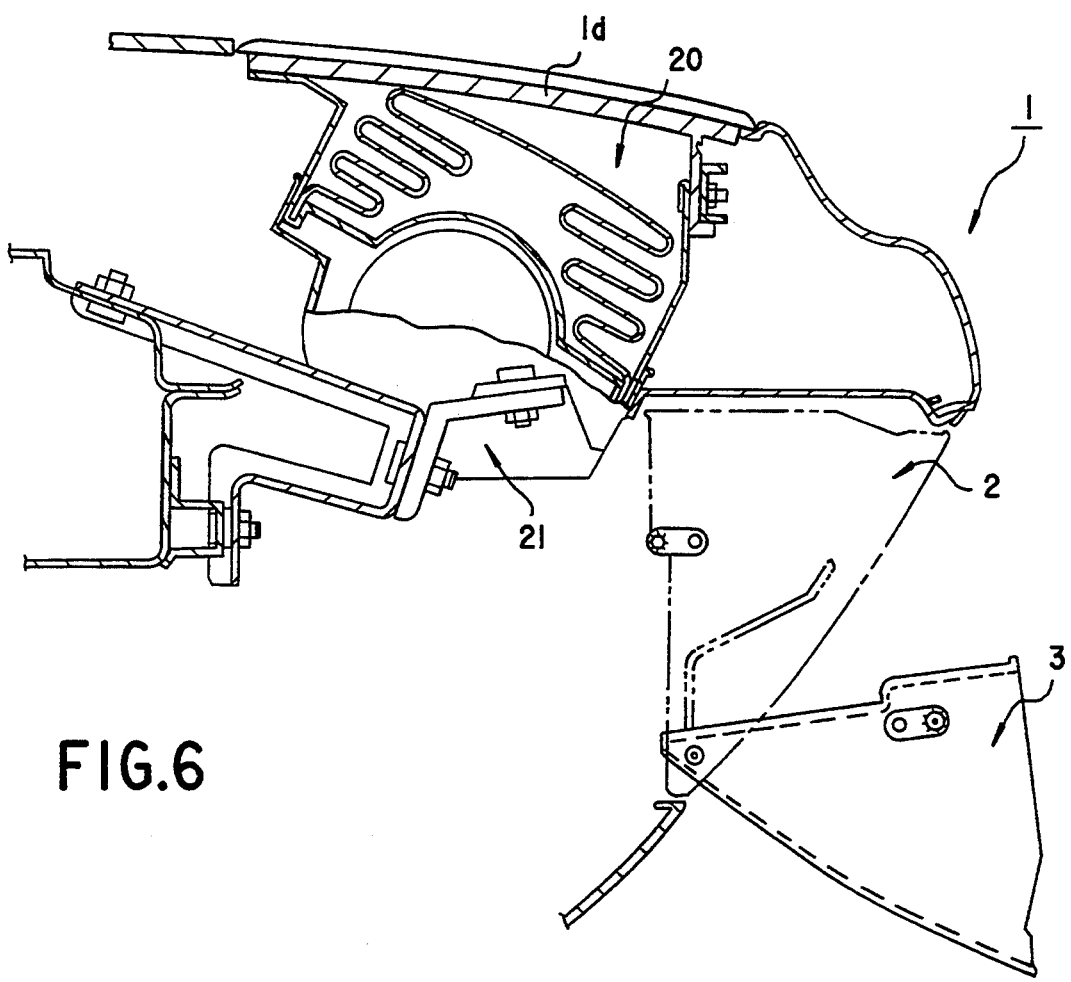
FIG. 6 is a vertical cross-sectional view showing an arrangement in which the inflator of an air bag for a passenger seat is positioned behind the glove box.

FIG. 6 shows an arrangement in which an inflator 21 of a passenger air bag 20 is positioned behind the glove box 3 in the opening 2 in the instrument panel 1. When the glove box 3 is unlocked and fully displaced out of the opening 2 as shown in FIG. 6, the serviceman can easily insert his arm through the opening 2 to reach the inflator 21 for servicing the inflator 21. The serviceman can easily and efficiently service the inflator 21 because he is not required to detach the glove box 3 and the instrument panel 1, but only required to unlock and pull the glove box 3 fully out of the opening 2. As the serviceman does not insert his arm from below the glove box 3 in doing his servicing work, he is not confined to a limited space in the passenger compartment, and can perform his work smoothly and reliably.

Figure 7:
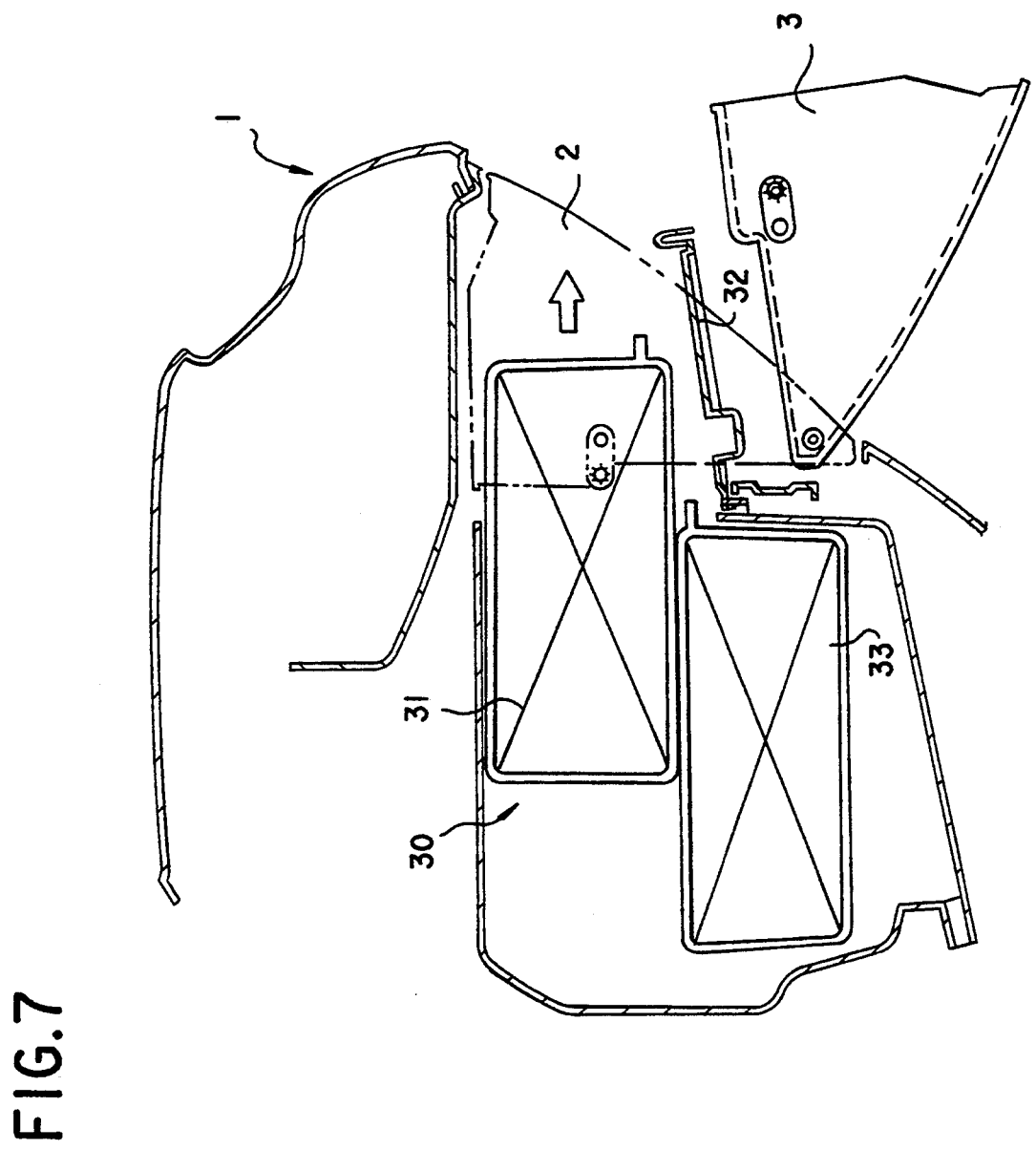
FIG. 7 is a vertical cross-sectional view showing an arrangement in which the filter of an air-conditioning unit is positioned behind the glove box.

FIG. 7 illustrates another arrangement in which filters 31, 33 of an air-conditioning unit 30 are positioned behind the glove box 3 in the opening 2 in the instrument panel 1. When the glove box 3 is unlocked and fully displaced out of the opening 2 as shown in FIG. 6, the serviceman can easily insert his arm through the opening 2, open a lid plate 32, and pull the upper filter 31 as indicated by the arrow. After having removed the filter, the serviceman insert the arm again through the opening 2, hold the lower filter 33, and lift and remove the lower filter 33. Thereafter, the serviceman place new filters through the opening 2 and set them in place in the air-conditioning unit 30. Consequently, the serviceman can easily and efficiently replace the filters 31, 33 because he is not required to detach the glove box 3 and the instrument panel 1, but only required to unlock and pull the glove box 3 fully out of the opening 2. As the serviceman does not insert his arm from below the glove box 3 in doing his replacing work, he is not confined to a limited space in the passenger compartment, and can perform his work smoothly and reliably.

The glove box structure according to the present invention can be applied to existing glove boxes because the glove boxes are not required to be modified substantially, but only the arm 8, the shaft 10, and other associated parts are required to be mounted on the glove boxes.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A glove box structure for use in an instrument panel in a motor vehicle, comprising:
    a partition assembly defining an opening;
    a glove box pivotally mounted at a lower end thereof in said opening for angular movement between a first angular position in which said glove box is fully disposed in said opening, a second angular position in which said glove box is partly displaced out of said opening, and a third angular position in which said glove box is fully displaced out of said opening;
    said partition assembly including a side partition having a fixed pivot connection for mounting said glove box and a limit member;
    said glove box having means defining a pivot axis for mounting in said pivot connection and an engaging member for engaging said limit member to lock said glove box in said second angular position; and
    releasing means mounted on said glove box for releasing said engaging member from said limit member to allow said glove box to move angularly about said pivot connection from said second angular position to said third angular position.

2. A glove box structure according to claim 1, wherein said releasing means comprises a shaft coupled to said engaging member and rotatable about its own axis to move said engaging member out of engagement with said limit member.

3. A glove box structure according to claim 1, wherein said limit member comprises a rail mounted on said side partition and said engaging member comprises a roll rotatably mounted on said glove box for rolling contact with said rail.

4. A glove box structure according to claim 3, wherein said releasing means comprises an arm supporting said roll and a shaft coupled to said arm and rotatable about its own axis to move said arm to displace said roll out of engagement with said rail when said glove box is in said second angular position.

5. A glove box structure according to claim 4, wherein said glove box has cam means for guiding said arm in movement thereof to displace said roll out of engagement with said rail, said releasing means including spring means for normally urging said arm in engagement with said cam means.

6. A glove box structure according to claim 1, further comprising an air bag including an inflator positioned behind said opening and accessible through said opening when said glove box is in said third angular position.

7. A glove box structure according to claim 1, further comprising an air-conditioning unit including a filter positioned behind said opening and accessible through said opening when said glove box is in said third angular position.

8. A glove box structure for use in an instrument panel in a motor vehicle, comprising:
 a partition assembly defining an opening;
 a glove box pivotally housed in said opening and angularly movable from said opening to an opening limit position in which said glove box partly opens said opening;
 a fixed lock member fixed to said partition assembly;
 a movable engaging member movably mounted on said glove box and normally engageable with said fixed lock member to lock said glove box in said opening limit position when said glove box is angularly moved to said opening limit position; and
 control means mounted on said glove box for moving said movable engaging member out of engagement with said fixed lock member to allow said glove box to angularly move from said opening limit position to a fully open position in which said glove box fully opens said opening.

9. A glove box structure according to claim 8, wherein said control means comprises a shaft couple to said movable engaging member and rotatable about its own axis to move said movable engaging member out of engagement with said fixed lock member.

10. A glove box structure according to claim 8, wherein said fixed lock member comprises a rail mounted on said partition assembly and said movable engaging member comprises a roll rotatably mounted on said glove box for rolling contact with said rail.

11. A glove box structure according to claim 10, wherein said releasing means comprises an arm supporting said roll and a shaft coupled to said arm and rotatable about its own axis to move said arm to displace said roll out of engagement with said rail when said glove box is in said opening limit position.

12. A glove box structure according to claim 11, wherein said glove box has cam means for guiding said arm in movement thereof to displace said roll out of engagement with said rail, said control means including spring means for normally urging said arm in engagement with said cam means.

13. A glove box structure according to claim 8, further comprising an air bag including an inflator positioned behind said opening and accessible through said opening when said glove box is in said fully open position.

14. A glove box structure according to claim 8, further comprising an air-conditioning unit including a filter positioned behind said opening and accessible through said opening when said glove box is in said fully open position.

* * * * *